United States Patent [19]

Ieki et al.

[11] Patent Number: 5,204,512
[45] Date of Patent: Apr. 20, 1993

[54] DEVICE FOR CONTROLLING COMMUNICATION BETWEEN ELECTRONIC INFORMATION CARDS AND HOST COMPUTER TO BE KEPT IN SECRET

[75] Inventors: Toshiharu Ieki, Yokosuka; Takafumi Kobayashi, Yokohama; Norio Shimamura; Niichi Kobayashi, both of Yokosuka; Takeshi Watanabe, Yokohama, all of Japan

[73] Assignee: NTT Data Communications System Corporation, Tokyo, Japan

[21] Appl. No.: 603,559

[22] Filed: Oct. 26, 1990

[30] Foreign Application Priority Data

Oct. 31, 1989 [JP] Japan .................. 1-285397

[51] Int. Cl.$^5$ ............................................. G06K 5/00
[52] U.S. Cl. ................................. 235/382; 235/379; 235/380; 235/492; 340/825.34
[58] Field of Search ............... 235/379, 380, 381, 382, 235/382.5, 492, 493; 340/825.34, 825.33

[56] References Cited

U.S. PATENT DOCUMENTS

| | | | |
|---|---|---|---|
| 3,860,793 | 1/1975 | Roe et al. | 235/61.9 R |
| 4,277,832 | 7/1981 | Stuckert | 235/380 |
| 4,453,074 | 6/1984 | Weinstein | 235/380 |
| 4,544,833 | 10/1985 | Ugon | 235/380 |
| 4,549,075 | 10/1985 | Saada et al. | 235/380 |
| 4,575,621 | 3/1986 | Dreifus | 235/380 |
| 4,709,136 | 11/1987 | Watanabe | 235/379 |
| 4,752,678 | 6/1988 | Rikuna | 235/380 |
| 4,758,718 | 7/1988 | Fujisaki et al. | 235/492 |
| 4,833,310 | 5/1989 | Shimamura et al. | 235/479 |
| 4,835,375 | 5/1989 | Shimamura et al. | 235/474 |
| 4,877,946 | 10/1989 | Ando et al. | 235/379 |
| 4,877,947 | 10/1989 | Mori | 235/379 |
| 4,897,531 | 1/1990 | Someya et al. | 235/440 |
| 5,093,862 | 3/1992 | Scwartz | 235/380 |

FOREIGN PATENT DOCUMENTS

| | | | |
|---|---|---|---|
| 60-86664 | 5/1985 | Japan | 235/380 |
| 2-297297 | 12/1990 | Japan | 235/382 |

*Primary Examiner*—Eugene R. LaRoche
*Assistant Examiner*—Tan Nguyen

[57] ABSTRACT

System for controlling communication between electronic information cards, such as IC-cards and a host computer, to be kept in secret. In order to protect the data, various countermeasures have been proposed in which the data are enciphered to be sent and deciphered for reading out. There is a problem, however, the cyphograph is difficult to keep secret when it is used for a long time. The invention intends to provide a device having at least two connectors for an IC-card stored with an algorithm for enciphering the data and another IC-card or other IC-cards for making communication with the host computer so as to readily change the first IC-card with a new one storing another algorithm.

5 Claims, 2 Drawing Sheets

DEVICE FOR CONTROLLING COMMUNICATION BETWEEN ELECTRONIC INFORMATION CARDS AND HOST COMPUTER TO BE KEPT IN SECRET

BACKGROUND OF THE INVENTION

The invention relates generally to a device for controlling communication between a host computer and a plurality of electronic information cards, e.g. so-called IC-cards to be connected intermediately therethrough, and more particularly to an intermediate device adapted to encipher data to be communicated therebetween and readily renew a communication algorithm for enciphering said data.

The so-called IC-card or integrated circuit card comprises, as shown in FIG. 3 of the accompanying drawings, a card-like substrate SUB having a microcomputer MC as a data processor and a semiconductor memory MEM embedded therein, and a plurality of contact points CP which are each connected with the above MC and MEM, and arranged exposedly flush with the outer surface of the substrate SUB.

Recently an IC-card having no electric contacts has been proposed in which a plurality of coils or light receptors are provided instead so as to receive information in the form of high-frequency signals or from a light emitter so as to be stored in the memory.

The IC-card may be electrically connected with the host computer provided with a card connector having contact pins of the number and arrangement corresponding to those of the contact points CP of the card so as to read data stored in the MEM thereof and write new data in the MEM. In general the IC-card is, however, loaded in the intermediate device having card connector as referred to above through a slit formed in the casing wall thereof so that the communication for reading-out and writing-in of the data may be made between the card and the host computer which is linked with the communication control device through a cable.

Such intermediate devices as the IC-card reader/writer are described in many publications, e.g. in U.S. Pat. Nos. 4,724,030, 4,833,310, 4,835,375 given to the applicant or assignee of this patent application, and have been in actual use.

There is a fear, however, particularly in the latter case that the data stored or to be stored in the IC-card is "stolen" by any third party making access to the communication cable. In order to protect the data, various countermeasures have been proposed, among which there is a method where the intermediate device or the IC-card is provided with an ROM storing an algorithm for communication so as to encipher the data which is deciphered in the host computer, or vice versa to be read or written. Such process and apparatus are described in many publications, e.g. U.S. Pat. Nos. 4,544,833 to Michel Ugon in France, 4,453,074 to Stephen B. Weinstein in U.S.A.

Since a ROM is generally combined in the IC-card or the card connector when assembled, the algorithm to be kept in secret may be leaked to a third party through the manufacturer or assembler. Furthermore, when one algorithm is used for a long time, a algorithm may be disclosed to the third party tapping the communication cable in order to decipher the enciphered data.

Thus, it is necessary to often renew the communication algorithm. For that purpose, however, the ROM must be removed from IC-card or the card connector to be exchanged with a new ROM storing another communication algorithm, which necessitates a troublesome work by a skilled person and consequently a considerably high cost.

SUMMARY OF THE INVENTION

The invention, thus, intends to provide an intermediate device adapted to readily change the algorithm for communication between the IC-card loaded therein and the host computer, without necessity of exchanging the ROM.

This object can be attained according to the present invention fundamentally by providing at least two card connectors in the device, one for the IC card to be connected with the host computer for the communication, while the other is for an IC-card having an ROM stored with a communication algorithm for enciphering the data, which may be changed only by exchanging the IC-card with a new one containing another communication algorithm. When a plurality of IC-cards respectively storing various algorithms have been prepared in advance, the algorithm may be very readily changed when necessary.

The device according to the present invention also may be used for communication between at least two IC-cards for the purpose of exchanging the data therebetween.

Thus, another aspect of the present invention is to provide a device for allowing exchange of data between at least two IC-cards loaded therein.

BRIEF DESCRIPTION OF THE DRAWINGS

Other features and advantages of the present application are provided in the following description with reference to the accompanying drawings; in which.

DESCRIPTION OF THE PREFERRED EMBODIMENT

Figure 1:
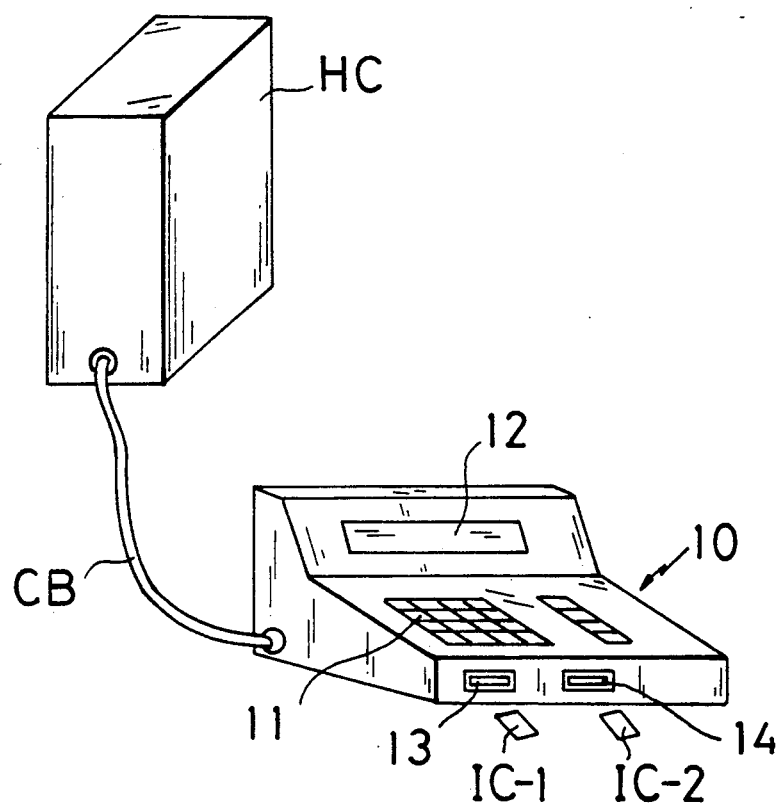
FIG. 1 is a sketch schematically showing an embodiment of the intermediate communication control device according to the present invention and a host computer linked therewith via a communication cable.
Figure 3:
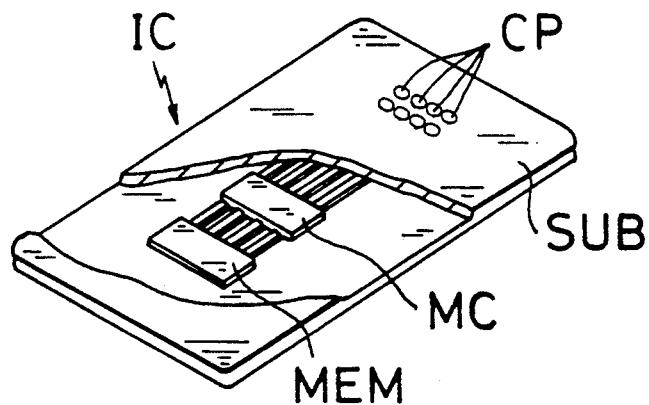
FIG. 3 is a perspective view of a typical IC-card as one example of electronic information cards to be used in the present invention, partly cut off for illustrating the inner arrangement.

With reference to FIG. 1, an intermediate communication control device 10 for communication control according to the present invention is provided with a keyboard 11, an indicator 12 and at least two slits 13, 14 respectively for IC-cards IC-1, IC-2 to be inserted therethrough as explained at the beginning of the specification with reference to FIG. 3.

The inserted card IC-1 or IC-2 is automatically driven to be positioned on a concerned card connector in the device which has contact pins of the number and arrangement corresponding to the contact points CP thereof so as to establish electric connection between the card and the host computer HC via the cable CB for the communication therebetween, and the card is automatically ejected so that an end of the card is exposed out of the slit for easy removal by the card owner.

The mechanism or arrangement itself for carrying out the above operation has no direct connection with the invention so that further illustration thereof is omitted here.

Figure 2:
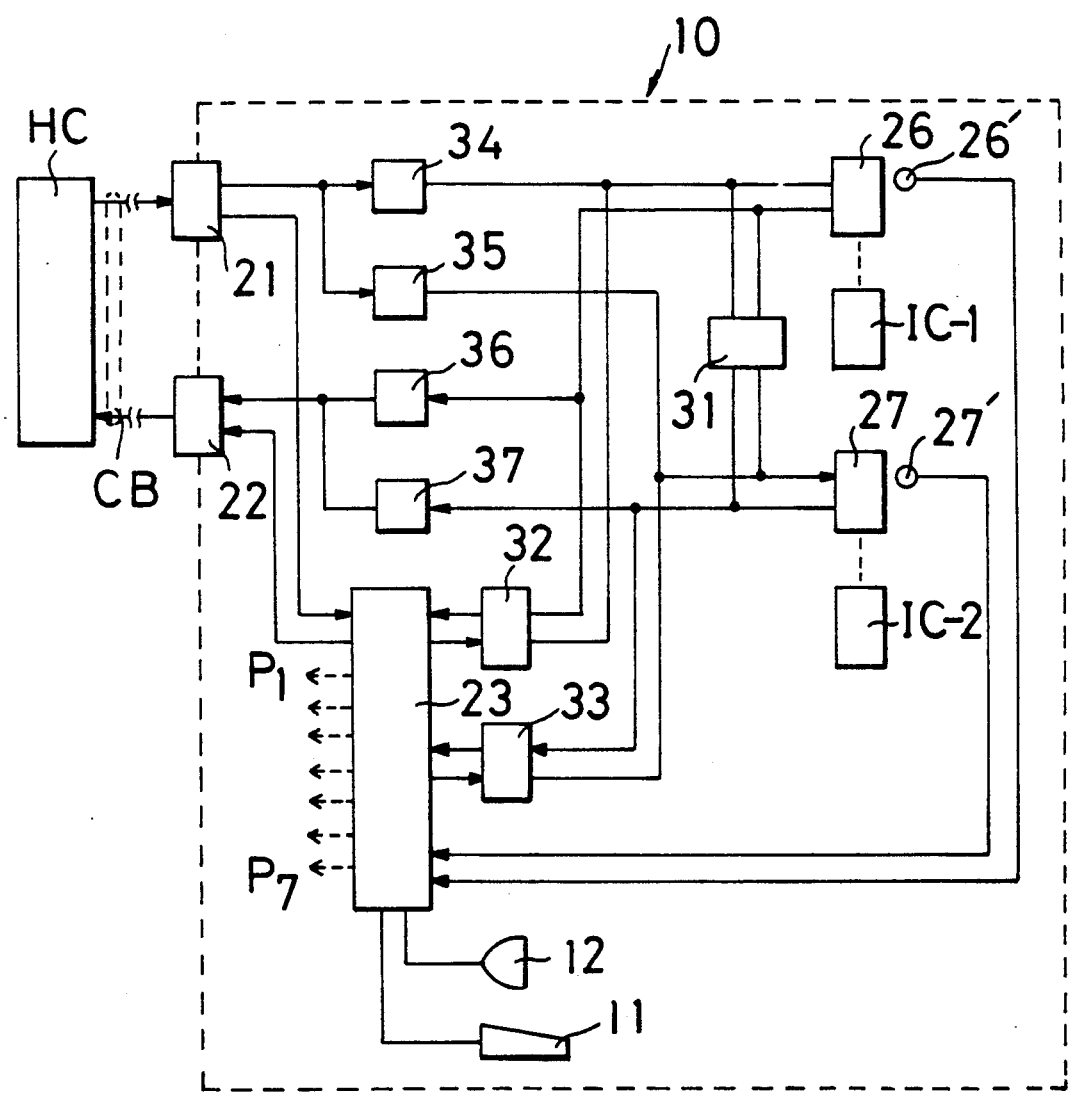
FIG. 2 is a block diagram showing the arrangement and connection of essential elements for the device according to the present invention.

With reference to FIG. 2, the intermediate communication control device 10 encircled by phantom lines comprises the following elements linked to one another.

The cable CB from the host computer HC is linked with a signal receiving connector 21 and a signal transmitting connector 22, which are then linked with communication control means 23, which is then linked with a keyboard 11 and an indicator 12 for the communication control device 10 itself.

There are further provided card connectors 26, 27, as shown at the right side in FIG. 2, each having contact pins (not shown) as referred to above for the cards IC-1, IC-2 and accompanied with card detectors 26', 27' which are linked with the communication control means 23 so that a signal generated by each of the detectors actuates the control means.

The card connectors 26 and 27 are linked with each other by switching means 31, and with the communication control means 23 respectively via switching means 32, 33 and further with the signal receiving and transmitting connectors 21, 22 respectively via switching means 34, 35, 36, and 37.

The communication control means 23, actuated by the signal from the card detectors 26', 27', regulates the switching means 31-37 and data from the keyboard 11, the host computer HC and the cards IC-1, IC-2 to be displayed on the indicator 12, as well as, data from the key board 11 to be sent to the host computer HC and the card connectors 26, 27.

In operation, when the first card IC-1 storing communication algorithm is positioned on the card connector 26, the card detector 26' generates a signal for actuating the communication control means 23 so as to supply electric energy for driving the card IC-1, as well as, a clock signal.

The communication control means 23 also outputs a switch control signal P1 so as to turn switching means 32 ON, whereby the communication control means 23 is electrically connected with the card connector 26 and consequently with the card IC-1. When a reset release signal is outputted by the communication control means 23 at this stage, the card IC-1 may itself generate an answer to reset (A.T.R.) signal showing properties thereof, such as a transfer rate. This A.T.R. signal is inputted in the host computer HC via the switching means 32, communication control means 23, transmitting connector 22 and the cable CB.

When receiving the A.T.R. signal from the card IC-1, the communication control means 23 outputs switch control signals P2, and P3 so as to turn the switching means 34, and 36 ON, whereby communication circuits of the card IC-1 with the communication control means 23 and with the host computer HC are established in addition to that between the communication control means 23 and the host computer HC.

When a command signal is output from the host computer to demand for a password or code number of the card IC-1 at this stage, the command is input to the communication control means 23 via the receiving connector 21 so as to display "INPUT PASS WORD" or the like on the indicator 12.

When the code number or password of the card IC-1 is input by operating the keyboard 11 at this stage, the card compares the code number stored within with that code number input via the keyboard 11. When both code numbers are in agreement, the card generates a signal sent to the host computer HC through the switching means 36 and the transmitting connector 22 so that access to the data region of the card IC-1 is now made possible.

Meanwhile, when the second card IC-2 to be communicated with the host computer is positioned on the second card connector 27, the card detector 27' generates a signal for actuating the communication control means 23 so as to supply electric energy for driving the concerned card and a clock signal to the card connector 27.

Concurrently the communication control means 23 generates a signal P4 so as to turn the switching means 33 ON, whereby the communication control means 23 is connected with the card connector 27 and consequently with the card IC-2, when the communication control means 23 outputs a reset release signal at this stage, the second card outputs an A.T.R. signal to be inputted in the host computer HC through the switching means 33 communication control means 23, transmitting connector 22 and cable CB.

When receiving the A.T.R. signal, the communication control means 23 outputs switch control signals P5, and P6 so as to turn the switching means 35, 37 respectifvely ON, whereby a communication circuit between the communication control means 23 and the card IC-2 may be established in addition to the already established circuits between the communication control means 23 and the host computer HC; the communication control means 23 and the card IC-1; the host computer HC and the card IC 1.

When a command signal is outputted from the host computer to demand for a password or code number of the card IC-2 at this stage, the command is to the communication control means 23 via the receiving connector 21 so as to display "INPUT PASSWORD" or the like on the indicator 12.

When the code number or password of the card IC-2 is input by operating the keyboard 11 at this state, the card compares the code number stored within with the code number input via the keyboard 11. When the both code numbers are in agreement, the card generates a signal sent in the host computer HC through the switching means 37 and the transmitting connector 22 so that access to the data region of the card IC-2 is now made possible.

Meanwhile, when it is necessary to read-out the data or write-in new data in the card IC 2 by the host computer HC, a signal demanding data transfer is generated thereby so as to the communication control means 23 to generate a signal P7 for turning the switching means 31 ON, whereby the first card connector 26 and the second card connector 27 are connected with each other. In reply to a request made at this stage, the data stored in the card IC-2 positioned on the connector 27 are input to the card IC-1 positioned on the connector 26 via the switching means 31. The card IC-1 enciphers the input data according to the communication algorithm stored therein. The enciphered data is input to the host computer HC through the switching means 36, transmitting connector 22 and communication cable CB.

When new data is to be written-in the card IC-2, the data are similarly enciphered at the side of the host computer HC to be sent to the communication control device 10 according to the invention via the cable CB, the enciphered data are input to the card IC-1 through the receiving connector 21 and the switching means 34 to be deciphered according to the algorithm stored therein and then stored in the card IC-2 via the switching means 31.

It is noted, in this connection, that the communication control device 10 according to the present invention, which comprises at least two card connectors, may be used for the IC-cards to exchange data stored therein with each other, by turning the switching means 31 ON according to the concerned command from the host computer HC through the communication control means 23. The communication between the IC-cards may be made at a higher transfer speed without intervention by the host computer.

When the card IC-2 is taken out of the concerned connector 27 after the communication with the host computer via the card IC-1 storing the communication algorithm is finished, a signal showing absence of the card is generated from the detector 27', in reply to which the control means 23 turns the switching means 31, 33, 35 and 37 respectively OFF, whereby the communication circuits for the second card connector 27 with the host computer HS and first card connector 26 via the control means 23 are disconnected.

The first card IC-1 remains on the card connector 26 so that the communication circuits between the communication control means 23 and the host computer; the control means 23 and the card IC-1; the card IC-1 and the host computer HC are maintained, whereby any other card to be communicated with the host computer may be loaded at any time.

If the communication algorithm must be changed, it is necessary only to take the card IC-1 out of the connector 26 to be exchanged with any other card storing any other algorithm and positioned thereon.

The communication control device 10 in the illustrated embodiment comprises only two card connectors, but if necessary, of course three or more card connectors may be provided. These will be no necessitity for further explaining on the arrangement and operation in such cases.

In the specification inclusive of the Claims the term "contacts" is used under the promise of that the IC-card has exposed electiric contact points as illustrated in FIG. 1. It should be noted that the no contact IC-card, which may be of high-frequency signal or optical signal as referred to at the beginning, may be of course used for the invention. In this case, the term "contacts" should be replaced with or interpreted as "light receptors" or "coils".

What is claimed is:

1. A system for controlling communication between an electronic information card including contacts and a host computer for reading and writing data to and from the electronic information card via a communication cable, said system comprising;

a first terminal connector, connected to the communication cable for receiving information including data and signals transmitted from the host computer;

a second terminal connection, connected to the communication cable for transmitting information including data and signals on the electronic information card to the host computer;

at least two card connectors, each having contacts corresponding to the contacts of the electronic information card and each having a card detector for generating signals representing a presence and absence of a card therein, wherein one of the card connectors receives a card storing at least one fixed communication algorithm, and the other receives the electronic information card such that data stored in the electronic information card is enciphered and deciphered according to the at least one fixed communication algorithm by passing the data through the card storing the at least one fixed communication algorithm;

means for controlling the communication in response to the signals from the at least two card connectors so as to connect and disconnect circuits between the first and second terminal connectors and the at least two card connectors and between the means for controlling and the at least two card connectors; and switching means, between the at least two card connectors, and also between each of the at least two card connectors and each of the first and second terminal connectors, and also between each of the at least two card connectors and the means for controlling, so that the means for controlling turns predetermined switches ON and OFF in response to a signal from each of the at least two card connectors and the host computer.

2. The system of claim 1, further comprising display means for displaying command signals from the host computer.

3. The system of claim 2, further comprising:
   key-board for inputting information including a password assigned to the electronic information card in response to a request command from the host computer;
   wherein said display means is an indicator for displaying information including command signals from the host computer.

4. The system of claim 1, wherein the card storing the at least one fixed communication algorithm and the electronic information card are coupled to said at least two card connectors via electrical contacts.

5. The system of claim 1, wherein the card storing the at least one fixed communication algorithm and the electronic information card are coupled to said at least two card connectors via light receptors or coils.

* * * * *